Patented July 14, 1936

2,047,674

UNITED STATES PATENT OFFICE 2,047,674

MANUFACTURE OF TRANSPARENT COLORED VARNISHES AND THE LIKE

George Dingwall and John Oberhauser, Toronto, Ontario, Canada

No Drawing. Application November 20, 1933, Serial No. 698,874

6 Claims. (Cl. 134—26)

This invention relates to the preparation of varnishes, stains, lacquers and the like which will form transparent films having a wide range of colors.

As the basis of the product we employ any one or more of the gums or resins (natural or artificial) employed in the varnish and lacquer making industry. This varnish base is brought to a liquid condition by means of a solvent and heat. The solution of the base has then added thereto a solution of a mordant chosen from the group of chemical reagents hereinafter set forth, heat being used to facilitate solution as may be necessary. The next step is to mix together a suitable proportion of the solution of the base and the solution of the mordant together with sodium acetate or an equivalent reagent. This reagent serves to carry the mordant into the base. By experiment we find that borax and carbonates and oxides of the alkali metals are substantially equivalents of the sodium acetate.

The mixture is stirred thoroughly and allowed to stand for a short time, say fifteen minutes, after which a moderate heat is applied to drive off the light volatile solvents of the mordant, if such have been employed.

The remaining liquid is then drawn off from any excess of sodium acetate or other solids which may settle and the remaining solvents of the base are then slowly evaporated till a hard brittle mass remains containing the gum or resin and the mordant. If water be employed as the solvent of the mordant, separation of the water from the gum or resin solution is effected by decantation and the solution then evaporated to dryness.

The mordant-containing gum or resin is then dissolved in a suitable solvent such as used in the varnish and lacquer industry at a temperature suited to the particular gum or resin used. When this solution has cooled to a temperature between 60° and 100° F., a "basic dye-stuff", that is a basic aniline dye, is added. This mixture is thoroughly stirred until the coloring matter is dissolved and thoroughly distributed through the mass.

This colored liquid mass can then be used in suitable proportions to give any desired color and tint to varnishes, stains, lacquers and the like of all kinds.

A modification of the process may be employed as follows. The solid mordanted gum or resin can be added to a lacquer or varnish during its process of manufacture and the coloring material added as a last step with the application of a low heat for a considerable period of time.

In a further modification the mordanted gum or resin is first dissolved in the same liquid solvent as used in the preparation of the lacquer or varnish and thereafter added to the lacquer or varnish. The coloring material is finally added as in the last described modification.

For quick drying varnishes the solid mordanted gum or resin may be dissolved in the very volatile solvents used in such varnishes, such as benzine, toluol, and benzole, and the coloring material added. This liquid may then be added directly to the varnish to color it.

The varnish base employed may comprise any one or more of the following: natural and artificial varnish gums and resins, and oleo-resinous bodies such as the balsams, but not usually a nitro-cellulose, though the colored product of our process may be used to color nitro-cellulose lacquers.

The solvent employed for the varnish base may be benzine, toluol, benzole or any other solvent known in the industry.

The mordant may be a reagent chosen from the group comprising metal chlorides soluble in alcohol, namely chlorides of copper, iron, lithium, magnesium, manganese, nickel, sodium, strontium, barium, aluminum, cadmium, and cobalt; potassium chloride soluble in water; chromates of calcium and strontium soluble in alcohol or water; cyanides soluble in water, namely sodium ferrocyanide, potassium ferrocyanide, potassium ferric-cyanide, ferric ferric-cyanide and ferric ferrocyanide; sulphate soluble in water, namely sulphates of copper, iron, manganese, nickel, sodium, cobalt, and cadmium; and strontium sulphate soluble in water by salt treatment.

The solvent for the mordant must be, of course, adapted to the particular mordant employed. If an alcohol soluble mordant be employed, the solvent will usually be methyl or other alcohol, acetone or formaldehyde. For water soluble mordants such as the cyanides or sulphates the solvent employed will, of course, be water.

A transparent ink for offset printing can be prepared by proceeding in a general way as hereinafter set forth, but choosing as the varnish base the oleo-resins such as Canada balsam and balsam copaiba. After the mordant containing gum has been produced add to it 60% to 70% of turpentine by weight and about 1% of glycerine relative to the turpentine volume. The mixture is then slowly boiled at a moderate temperature, and the coloring material, "basic dyestuff", added and thoroughly stirred in. The mixture is allowed to cool to atmospheric temperature and is then ready for use.

The following are specific examples of our process in which the proportions are parts by volume of the whole:

Example I 100 parts of resin are melted and mixed with from 100 to 150 parts of benzene in a known manner. We then prepare a solution of 10 parts of copper or iron chloride in 20 parts of methyl alcohol using heat as may be necessary to aid solution. The resin solution and the mordant solution are then mixed and thoroughly agitated together with 10 to 20 parts of sodium acetate, borax, or a carbonate or oxide of the alkali metals, sodium acetate being preferred.

A low heat is then applied to drive off the solvent of the mordant and the further treatment is as hereinbefore described.

Example II

In the preparation of stains a somewhat cheaper process may be employed, copper sulphate or ferric sulphate or one of the cyanides of Example I and water for the alcohol. In other respects the process remains substantially the same.

What we claim as our invention is:

1. A process of preparing transparent colored varnishes and the like which comprises forming a solution of a varnish base in a solvent thereof; mixing therewith a solution of a mordant; adding to the mixture sodium acetate in a proportion at least equal to that of the mordant, driving off by heat the more volatile solvents; separating the remaining solution from precipitated solids; evaporating the mixture to dryness; dissolving the resulting dried mordanted material in a varnish solvent; stirring in a basic aniline dye; and lastly using the colored mixture to color a separately prepared varnish.

2. A process of preparing transparent colored varnishes and the like which comprises forming a solution containing a varnish base, a solvent of the base, a basic aniline dye, a mordant of the coloring material employed; and sodium acetate.

3. A transparent colored varnish comprising a varnish base; a solvent therefor; a basic aniline dye; a mordant for the dye; and sodium acetate.

4. A process of preparing transparent colored varnishes and the like which comprises forming a solution containing a varnish base, a solvent of the base, a basic aniline dye, a mordant of the coloring material employed; and sodium acetate in the proportion of 1 to 2 parts of sodium acetate to mordant.

5. A transparent colored varnish comprising a varnish base; a solvent therefor; a basic aniline dye; a mordant for the dye; and sodium acetate in the proportion of 1 to 2 parts of sodium acetate to mordant.

6. In a process of preparing transparent colored varnishes and the like the steps comprising forming a solution of a varnish base in a solvent thereof; mixing therewith a solution of a mordant of the coloring material to be employed and also sodium acetate in a proportion at least equal to that of the mordant; and incorporating the mordanted mixture in a varnish together with a basic aniline dye.

GEORGE DINGWALL.
JOHN OBERHAUSER.